United States Patent [19]

Gordy et al.

[11] 3,924,186

[45] Dec. 2, 1975

[54] STAGGERED QUADRIPHASE DIFFERENTIAL ENCODER AND DECODER

[75] Inventors: Robert S. Gordy, Largo; David E. Sanders; Alfred T. Anderson, both of St. Petersburg, all of Fla.

[73] Assignee: NCR Corporation, Dayton, Ohio

[22] Filed: Feb. 7, 1974

[21] Appl. No.: 548,133

[52] U.S. Cl. ...................... 325/30; 178/67; 178/88; 325/163; 325/320

[51] Int. Cl.$^2$ ........................................ H04B 1/00

[58] Field of Search ............ 178/67, 88, 66; 325/30, 325/163, 320; 340/347 DD

[56] References Cited

UNITED STATES PATENTS 3,349,330 10/1967 Wedmore .......................... 325/320

*Primary Examiner*—Albert J. Mayer

*Attorney, Agent, or Firm*—J. T. Cavender; Albert L. Sessler, Jr.; Edward Dugas

[57] ABSTRACT

A differential encoder-decoder implementation for staggered quadriphase PSK modulation wherein a stream of digital data is interleaved into a first and a second channel, at staggered clock times, by the transitions in a clock signal and an inverted clock signal respectively. The clocked data signals in each channel are logically AND'ed to the channel associated clock signal and divided in rate by a common factor to provide the channel encoded signals. The encoded signals from the two channels are fed to individual modulators for modulating carrier signals in quadrature. The modulated quadrature carrier signals are combined into a staggered quadriphase differential PSK modulated signal which is transmitted to a receiver over a transmission path. The receiver detects and demodulates the received signal to provide two data streams. A decoder channel is provided for each data stream, wherein each data stream is decoded independently of the other. A deinterleaver receives the two decoded data streams and by utilizing clock signals, recovered from the bit timing in the received signal, places the data into a single stream of digital data which data stream corresponds to the stream of digital data received by the encoder.

17 Claims, 9 Drawing Figures

STAGGERED QUADRIPHASE DIFFERENTIAL ENCODER AND DECODER

BACKGROUND OF THE INVENTION

The present invention is directed to a digital data transmission encoding and decoding system which uses staggered quadriphase differential modulation techniques.

Prior art digital data transmission systems utilize quadrature phase modulation of a carrier signal to conserve transmission bandwidth. In quadrature phase modulation the carrier signal is divided into a pair of quadraturely related signals, which signals are modulated by distinct modulating signals. The modulating signals may be analog or digital in nature. The modulated carrier signals are then combined and transmitted to a receiver. The receiver receives the quadrature phase modulated signal and demodulates the signal to recover the modulating signals.

In order to correctly demodulate the quadrature related signals the phase of the receiver generated carrier signals must be synchronized with the received modulated carrier signals.

In order to insure proper synchronization of the receiver generated carrier signal, prior art systems have generally utilized pilot tones. The pilot tones are added to the transmitted modulated carrier signals to control the phase of the carrier generators in the receiver. The addition of pilot tones to the transmitted signal, by necessity, decreases the efficiency of the transmission.

When PSK (phase shift keying) is used to modulate quadrature carrier signals, problems of phase and channel ambiguities arise in the receiver. Standard coherent detectors (demodulators) are unable to determine whether the data is the true data or its complement, which creates a phase ambiguity. In addition, a coherent detector, of the type generally used to demodulate quadrature phase modulated signals, provides two channels of output data, but without an indication of which channel is which. In attempting to recombine the demodulated data from the coherent detector without the use of pilot tones or other keying indicia, that is, indicia which is added to the transmitted signal, errors can result at the receiver.

A prior art patent of interest is U.S. Pat. No. 3,818,346, entitled "Differential Phase-Shift-Keyed Signal Resolver" by Fletcher et al. The receiver described in the patent is a quadrature phase differential phase-shift keyed receiver which does not require a transmitted pilot tone in order to synchronize a local phase reference signal to the incoming signal. The local phase reference signal is phase-shifted to a phase intermediate two of the four possible phases of the incoming signal. The phase-shifted local phase reference signal is then used to demodulate the incoming signal to detect the phase difference between the phase-shifted local reference signal and the incoming signal. Logic circuitry responds to the detected phase difference to remove the phase ambiguity between the local phase reference signal and the incoming signal.

The present inventive system eliminates the need for pilot tones by the use of a unique signal encoding and decoding technique, different from that disclosed in the above patent.

SUMMARY OF THE INVENTION

The present invention provides a new encoder and decoder particularly adapted for staggered quadriphase PSK modulation. The encoder operates upon a serial string of digital data by clocking (interleaving) the data between a first and a second channel of the encoder, at staggered clock times in response to transitions in a clock signal and an inverted clock signal, respectively. Means are provided in each channel for logically AND'ing the channel entered data signal with the channel associated clock signal. Means are provided in each channel for dividing the logically AND'ed signals by a common factor. In the preferred embodiment each AND'ed signal is divided by a factor of two. The signals from the dividing means are the channel encoded signals. The channel encoded signals are then fed to a two channel PSK modulator wherein quadrature carrier signals are modulated in four phases by the channel encoded signals. A summing means combines the modulated carrier signals into the encoded staggered quadriphase differential signal which signal is then transmitted to a receiver utilizing standard transmitting techniques.

In the receiver the modulated carrier signal is fed to a coherent detector, which detector demodulates the modulated carrier signal to provide a first and a second received encoded data stream. The received encoded data streams are related to the encoded data signals from the first and the second channels of the encoder, but with possible phase and channel ambiguities. The decoder of the present invention consists of a first and a second channel for receiving the first and the second received encoded data stream, respectively. Means are provided in each decoder channel for comparing a portion of the received encoded data stream against a previously received portion of the received encoded data stream to provide a difference signal. A deinterleaver means receives the difference signals from each of the decoder channels and in response to data clock signals, received from the coherent detector, gates the signals from the decoder channels to an output in the same serial order in which the corresponding signals were received by the input to the encoder. Both phase and channel ambiguities are eliminated by this technique.

From the foregoing it can be seen that it is a primar object of the present invention to provide an improved data encoder and decoder.

It is another object of the present invention to provide a unique staggered quadriphase encoder and decoder.

It is a further object of the present invention to provide an improved encoder and decoder for the transmission of digital data using staggered quadriphase PSK modulation techniques.

These and other objects of the present invention will become more apparent and better understood when taken in conjunction with the following description and drawings, wherein like characters indicate like parts and which drawings form a part of the present application.

DESCRIPTION OF THE PREFERRED EMBODIMENT OF THE INVENTION

Figure 1:
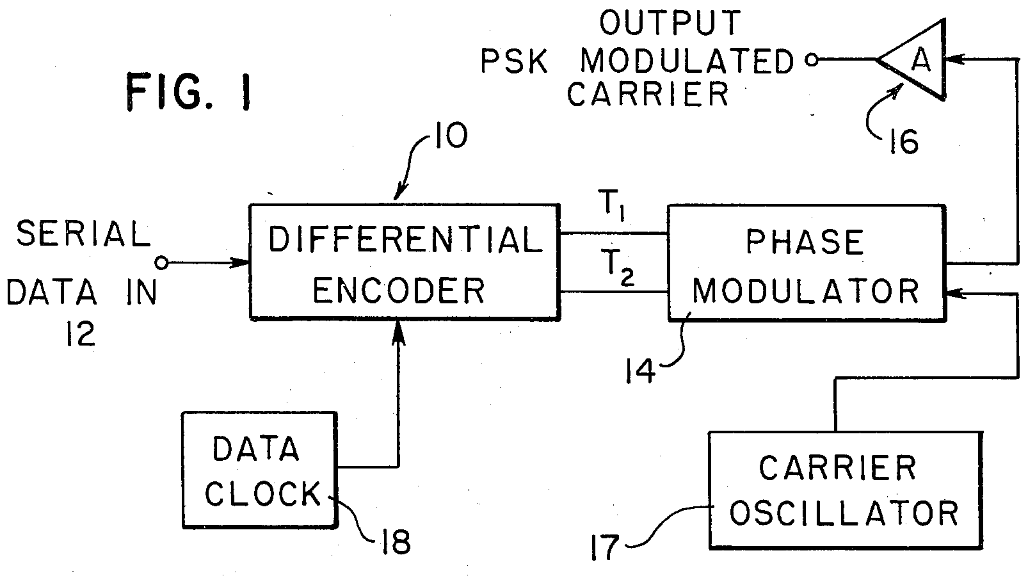
FIG. 1 is a block diagram illustrating the interconnection of the differential encoder with respect to a transmitter's phase modulator.

Referring to FIG. 1, a serial string of data bits 12, which are to be transmitted to a receiver over a transmission path, are fed to a differential encoder 10. The differential encoder 10 receives a data clock signal from data clock 18. In the preferred embodiment of the invention the data clock rate is equal to one-half the data bit rate. The differential encoder provides two encoded output signals $T_1$ and $T_2$, which signals have been derived by alternately clocking (interleaving) the serial string of data bits thru separate channels and by staggering the signals in time. Each of the encoded output signals are also divided by a common factor of two within the differential encoer. The signals $T_1$ and $T_2$ are directed to a quadrature phase shift keyed (PSK) modulator 14. Modulator 14 also receives, as an input, a carrier signal from a carrier oscillator 17. Within the modulator 14, the carrier signal is split into a pair of quadraturely related signals, each of which is modulated in phase by a respective one of the encoded signals $T_1$ and $T_2$. The modulated waves are then linearly added (summed) to provide the staggered quadriphase differentially encoded signal.

The staggered quadriphase differentially encoded signal from phase modulator 14 may be fed to an amplifier 16 and from there to a transmitter section (not shown) for transmission over a transmission path to a data receiver.

Figure 2:
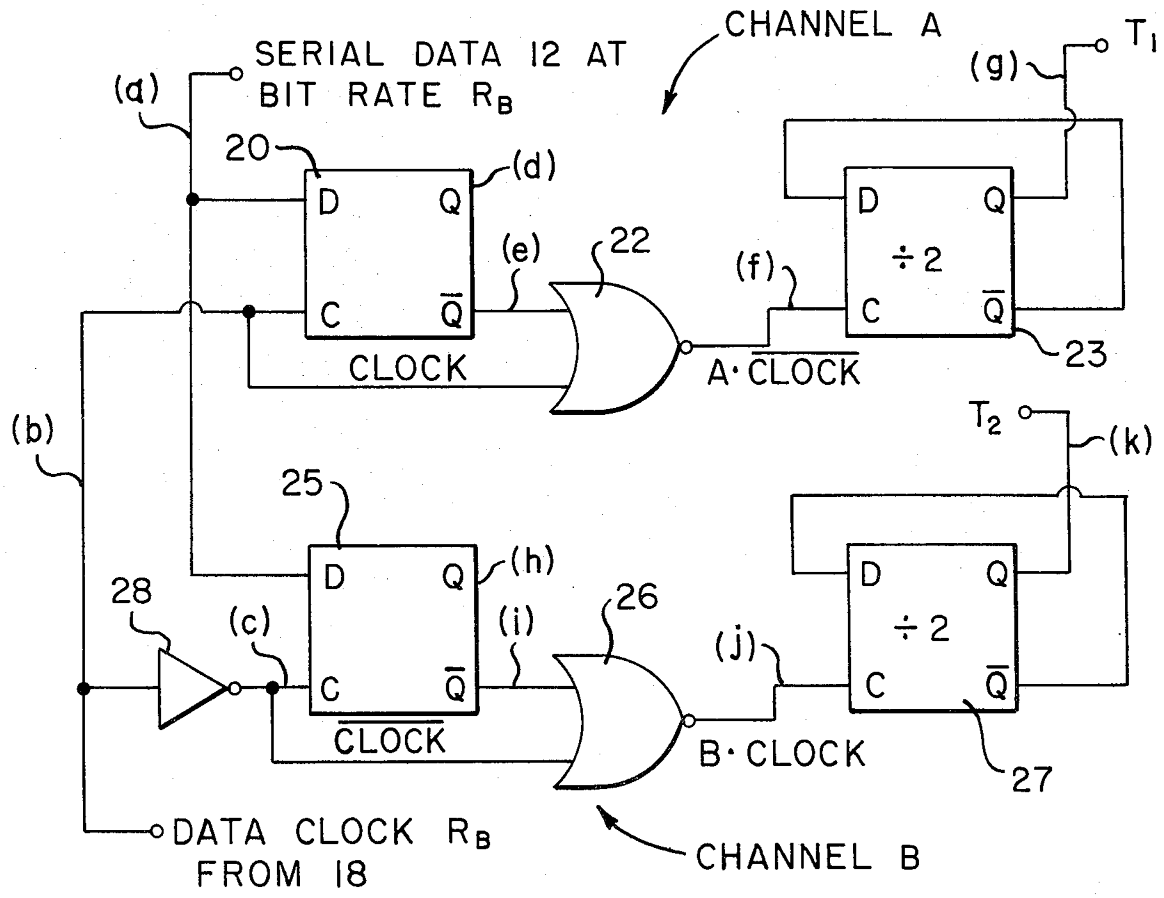
FIG. 2 shows in block diagram form the differential encoder portion of the present invention.

In FIG. 2, the implementation of the differential encoder is shown comprised of two channels, channel A and channel B. The input string of serial digital data 12 is applied to the data inputs D of clocked flip-flops 20 and 25.

For the purposes of this invention, a clocked flip-flop is defined as one having two output states, for example, a high (one) or a low (zero); at least a single data input designated D; a clock input designated C; and complementary outputs, designated Q and $\overline{Q}$. The logic state present at the data input D appears at the Q output after the occurrence of a particular clocking transition and remains at the Q output until the occurrence of the next like clocking transition. In the preferred embodiment of the present invention, the trailing edge of a falling clock pulse is used as the particular clocking transition.

A train of clock pulses (clock signal) from data clock 18 having a rate equal to one-half the bit rate of the serial digital data signal, is applied to the clocking input C of flip-flop 20, to an input of a NOR gate 22, and to the input of an inverting amplifier 28. Amplifier 28 inverts the train of clock pulses at its input to provide an inverted (complementary) train of clock pulses at its output. The inverted clock pulses from amplifier 28 are applied to the clocking input C of flip-flop 25, and to an input of a NOR gate 26. Each channel is thereby provided with a channel associated clock signal, with one being inverted from the other. The NOR gate 22 and the NOR gate 26 receive as their other input the signal at the Q outputs of flip-flops 20 and 25, respectively. The output signals from gates 22 and 26 are the logically AND'ed signals designated A. clock and B. clock respectively, wherein A denotes the A-channel signal and B the B-channel signal. Logically the NOR gates perform an AND'ing operation, which operation is based on the Theorem of De Morgan wherein it states in Boolean logic terms: $\overline{A+B} = \bar{A}\cdot\bar{B}$. From this theorem the following can be deduced: $\overline{A.\ clock} = A.\ \overline{clock}$. Stated in general terms, the logic signals passing thru each of gates 22 and 26 are logically AND'ed together. As is well within the knowledge of persons skilled in the art, other circuit arrangements are possible for deriving the desired AND'ing of two logic signals but for purposes of showing a preferred embodiment, applicants chose the use of NOR gates as being the most efficient arrangement.

The clocked flip-flops 23 and 27 receive at their C inputs, the A. clock signal and the B. clock signal, respectively. The $\overline{Q}$ outputs of flip-flops 23 and 27 are connected back to the D inputs of the respective flip-flops.

The output signals $T_1$ and $T_2$ are taken from the Q outputs of flip-flops 23 and 27, respectively. Flip-flops 23 and 27, with feedback, operate to divide the signals present at the clocking inputs C by a common factor of two. The signals $T_1$ and $T_2$ are the encoded signals that are used to drive the carrier phase modulator 14.

Figure 3:
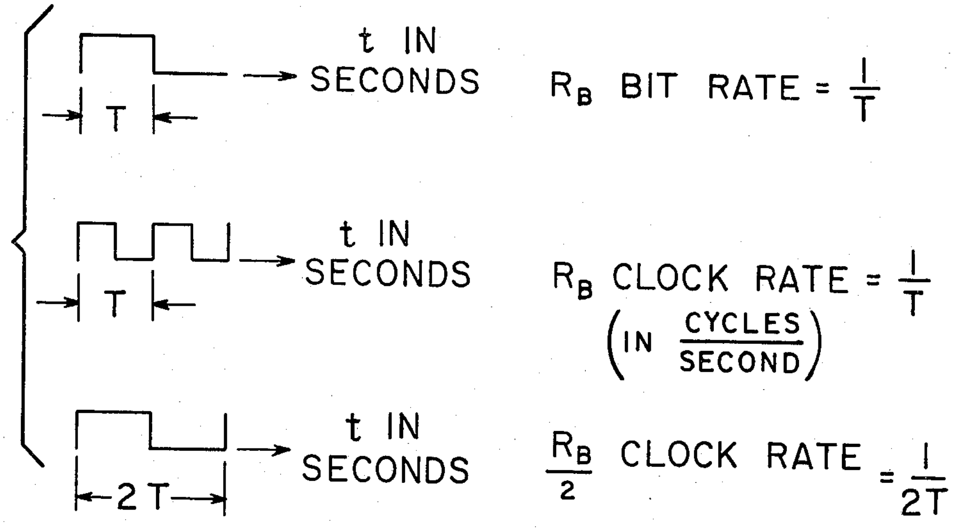
FIG. 3 illustrates waveform definitions which are useful in understanding the operation of the present invention.

Referring to FIG. 3, the waveform for a data bit rate of $R_B$, clock pulses having a rate of $R_B$, and clock pulses having a rate of $R_B/2$, are shown for corresponding periods of T. The width of each state of the clock signal, with a bit rate of $R_B/2$, is equal to the width of a bit of information.

Figure 4:
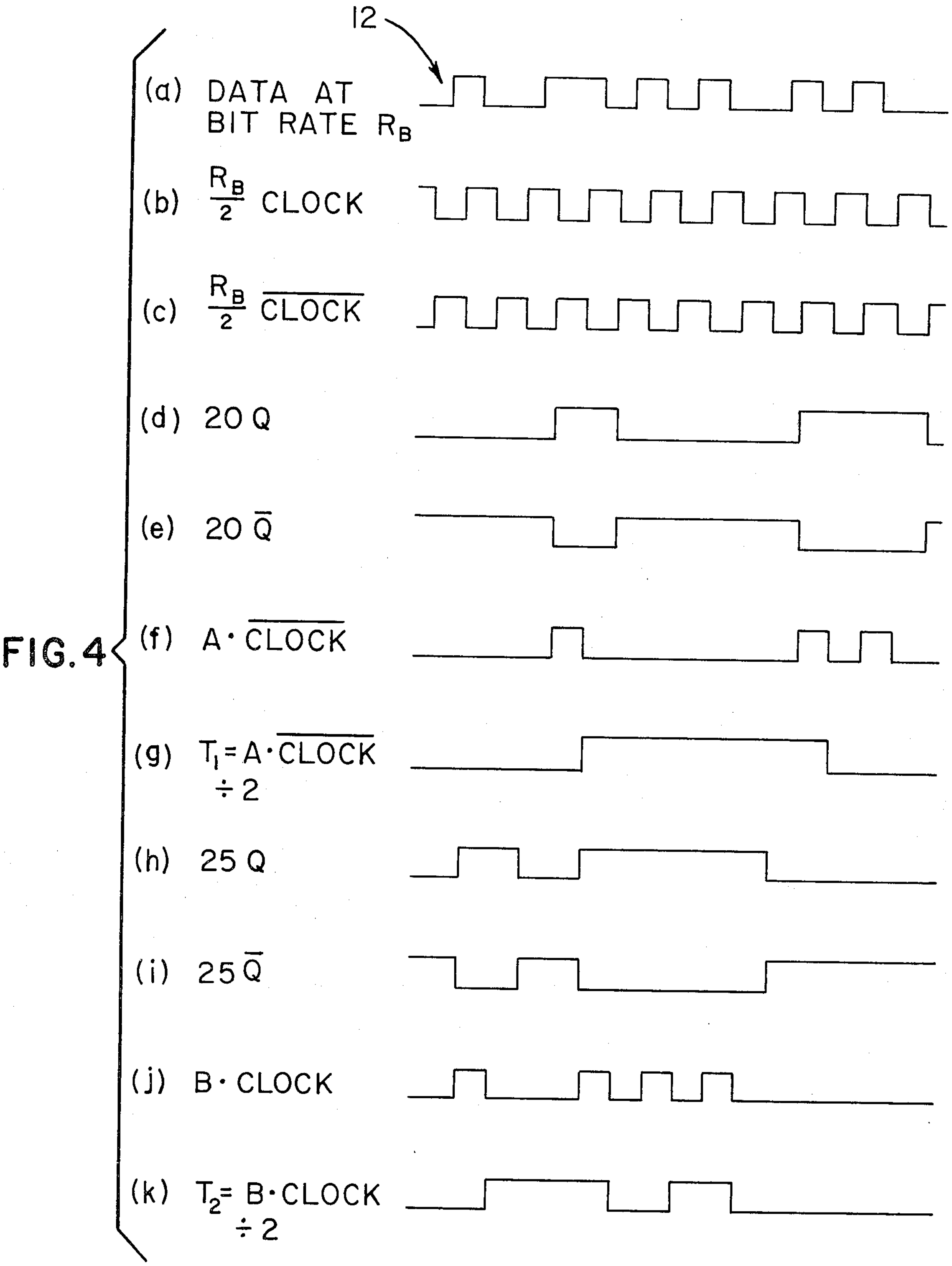
FIG. 4 is a timing diagram showing a series of waveforms illustrating the relationship of signals in different portions of the encoder of FIG. 2.

With reference to FIGS. 2 and 4, the detailed operations of the encoder of FIG. 2 will now be described. FIG. 4(*a*) illustrates a typical string of serial digital data 12, occurring at successive bit periods (rate) of $R_B$, having transitions between high and low levels which levels are equal to, for example 1's and 0's. FIG. 4(*b*) illustrates a first clock signal having a bit rate equal to $R_B/2$. The transitions of the clock signals occur at approximately the mid position of the data bits of the data signal 12, that is, the clock signal of FIG. 4(*b*) is shifted approximately 90° with respect to the data signal. FIG. 4(*C*) illustrates a second clock signal which corresponds to the first clock signal, but inverted, and which signal is present at the output of the inverting amplifier 28. The flip-flops 20 and 25 are triggered on each negative-going transition of their respective clock signals, that is, a transition from a high level to a low level, such that a signal appearing on a D input will appear inverted at a $\overline{Q}$ output and remain at the $\overline{Q}$ output until the flip-flop is again triggered by a negative-going transition of the respective clock signal. In effect then the serial digital data signal 12 is alternately sampled (interleaved) by the clock flip-flops at sample intervals which are staggered in time and which correspond to twice the bit rate. FIG. 4(*d*) illustrates the signal present at the Q output of flip-flop 20, which signal corresponds in level to the sampling of the data signal 12 at the negative transitions of the clock signal of FIG. 4(*b*) and the holding of the sampled level until the next transition. The signal at the $\overline{Q}$ output of flip-flop 20 is the FIG. 4(*d*) signal inverted, as shown in FIG. 4(*e*). This signal will be designated the A-channel signal. The clock signal of FIG. 4(*b*) is logically AND'ed with the A-channel signal of FIG. 4(*e*) in NOR gate 22 to provide the A. $\overline{clock}$ signal shown in FIG. 4(*f*).

The signal of FIG. (*f*) is applied to the C input of flip-flop 23 wherein it is divided in rate by a factor of two. FIG. 4(*g*) shows the divided-by-two signal, which signal corresponds to one channel of encoded data and is designated $T_1$. The divide-by-two action of flip-flop 23 results from the fact that the signal at the C input makes two changes of state, that is, from a positive transition to a negative transition, or vice versa, with only the negative transition being effective to change the state of the signal at the Q output. FIG. 4(*h*) illustrates the signal present at the Q output of flip-flop 25 when the data signal 12 of FIG. 1(*a*) and the inverted clock signal of FIG. 4(*c*) are applied to the D and C inputs, respectively. The signal present at the $\overline{Q}$ output is shown in FIG. 4(*i*). The signals of FIG. 4(*i*) and FIG. 4(*c*) are logically AND'ed together by the NOR gate 26 to provide the B. clock signal shown in FIG. 4(*j*). Flip-flop 27 divides the signal of FIG. 4(*j*) by two to provide the encoded B channel signal at its Q output, which signal is designated $T_2$ and is shown in FIG. 4(*k*).

In comparing the transition times of the encoded signals $T_1$and $T_2$, it is important to note that the transition times are staggered from each other, that is, when one signal is undergoing a transition the other is not. This particular feature of the encoding is particularly advantageous in that the modulation of the carrier signal does not have two phase transitions occurring simultaneously.

Figure 5:
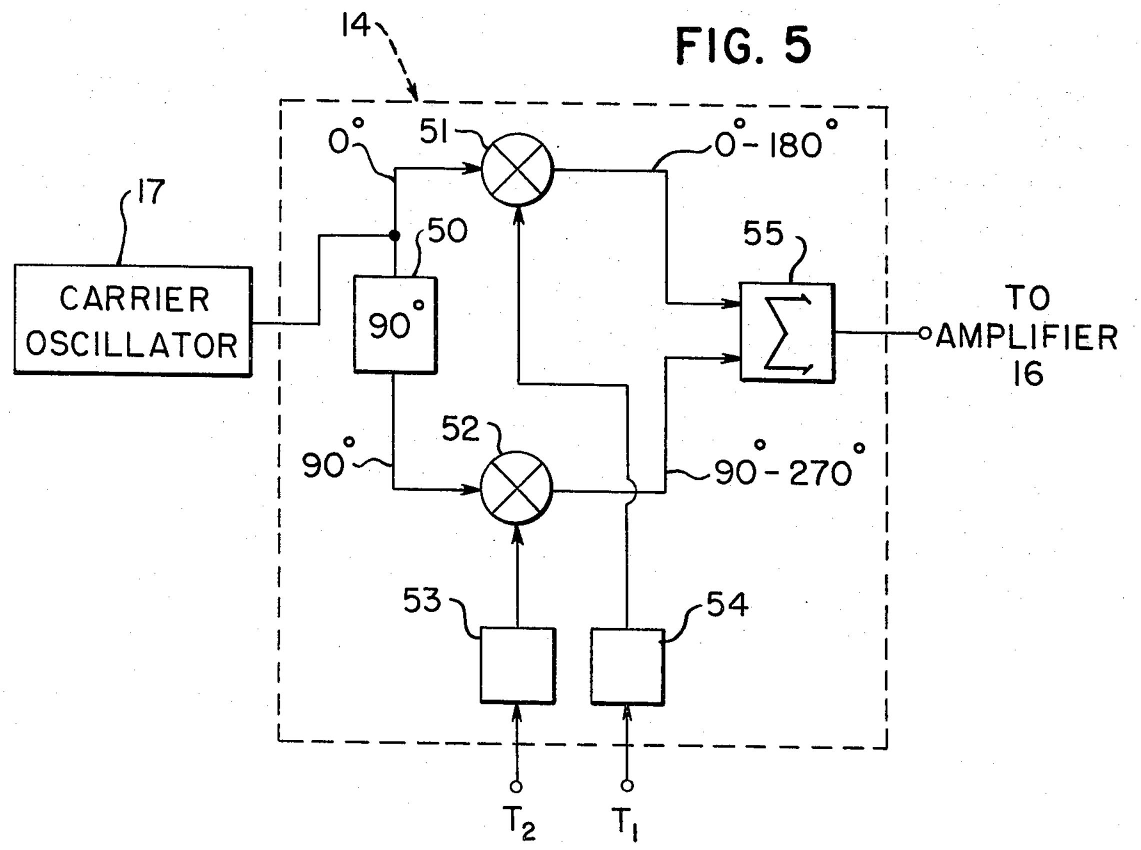
FIG. 5 is a block diagram of a phase modulator which may be used with the encoder of FIG. 2.

Referring now to FIG. 5, a phase modulator of the type that may be used as the phase modulator 14 of FIG. 1 is shown. The carrier oscillator 17 provides an RF carrier signal to the input of a 90° phase shifter 50, and to an input of a modulator 51. The signal $T_1$ is fed to a driver 54, which driver amplifies the power level of the signal to a level which is sufficient to drive the phase modulator 51. The output signal from modulator 51 is the carrier signal, phase shift keyed (modulated), between phases of 0° and 180°, under the control of the power amplified signal $T_1$. As an example, when the level of signal $T_1$ is high the phase of the signal from modulator 51 will be 0°, and when the level of signal $T_1$ is low the phase of the signal from modulator 51 will be 180°.

The encoded signal $T_2$ is fed to a driver 53 and from there to an input of a phase modulator 52. Phase modulator 52 phase shift key modulates the 90° carrier signal, between phases of 90° and 270°, in response to the level of the power amplified signal from driver 53.

The modulated signals from modulator 51 and 52 are combined in a summer 55 to provide a staggered quadrature phase modulated output signal which signal is fed to amplifier 16. The phase modulators 51 and 52 may be of the well-known balanced modulator type.

Figure 6:
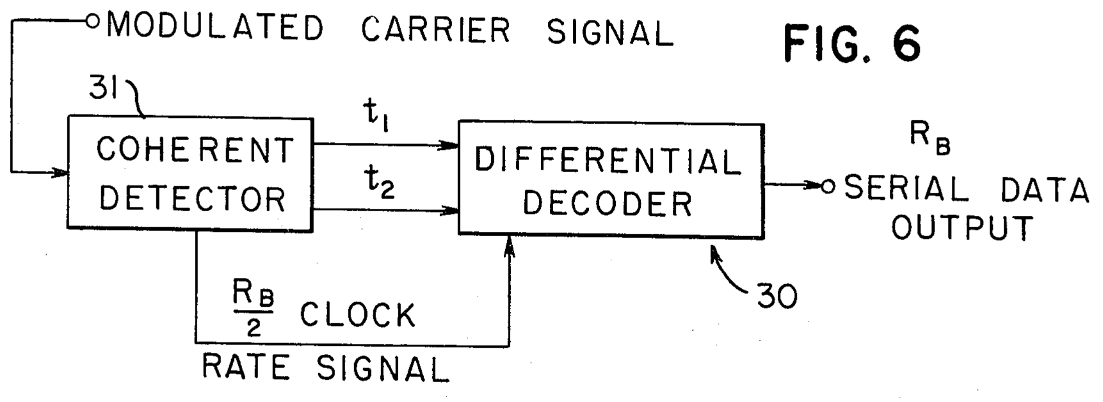
FIG. 6 is a block diagram illustrating the interconnection of the differential decoder with respect to a coherent detector of a receiver.

In FIG. 6, the differential decoder 10 of the present invention is shown connected to the coherent detector (demodulator) 31 of a receiver. The coherent detector 31 receives the staggered quadriphase differential PSK modulated signal and demodulates the signal, using well known PSK demodulation techniques, to derive the received encoded channel signals $t_1$ and $t_2$. In addition the coherent detector 31 detects the bit rate of the received signal and provides therefrom a clock signal having an $R_B/_2$ clock rate. Other well known circuits may be used in place of a coherent detector. Generation of a clock signal from the demodulated signals may be accomplished by any well known technique such as the technique of using a bit-timing phase locked loop wherein the output signal from the phase locked loop is used to generate the required clock signal. The provided clock being derived from the bit rate of the received signal is phase related to the bit rate of the received signal in the same relation as the encoder clock signals were related to the bit rate of the transmitted signal. The differential decoder 30, in response to the signals $t_1$, $t_2$ and the clock signal, provides a serial data output signal 70, which signal is the recovered serial data stream. The recovered serial data stream corresponds to the serial data stream that was received by the differential encoder 10 of FIG. 1 for transmission.

In demodulating the received signal, the coherent detector 31 cannot determine whether the $t_1$ signal or the $t_2$ signal corresponds to the transmitted A channel signal $T_1$ or the B channel signal $T_2$. Therefore a channel ambiguity exists at the output of the coherent detector. In addition a phase ambiguity exists between the signals $t_1$ and $t_2$ because the coherent detector cannot determine whether the data constituting $t_1$ and $t_2$ is inverted or true. The differential decoder 30 removes both of these ambiguities.

Figure 7:
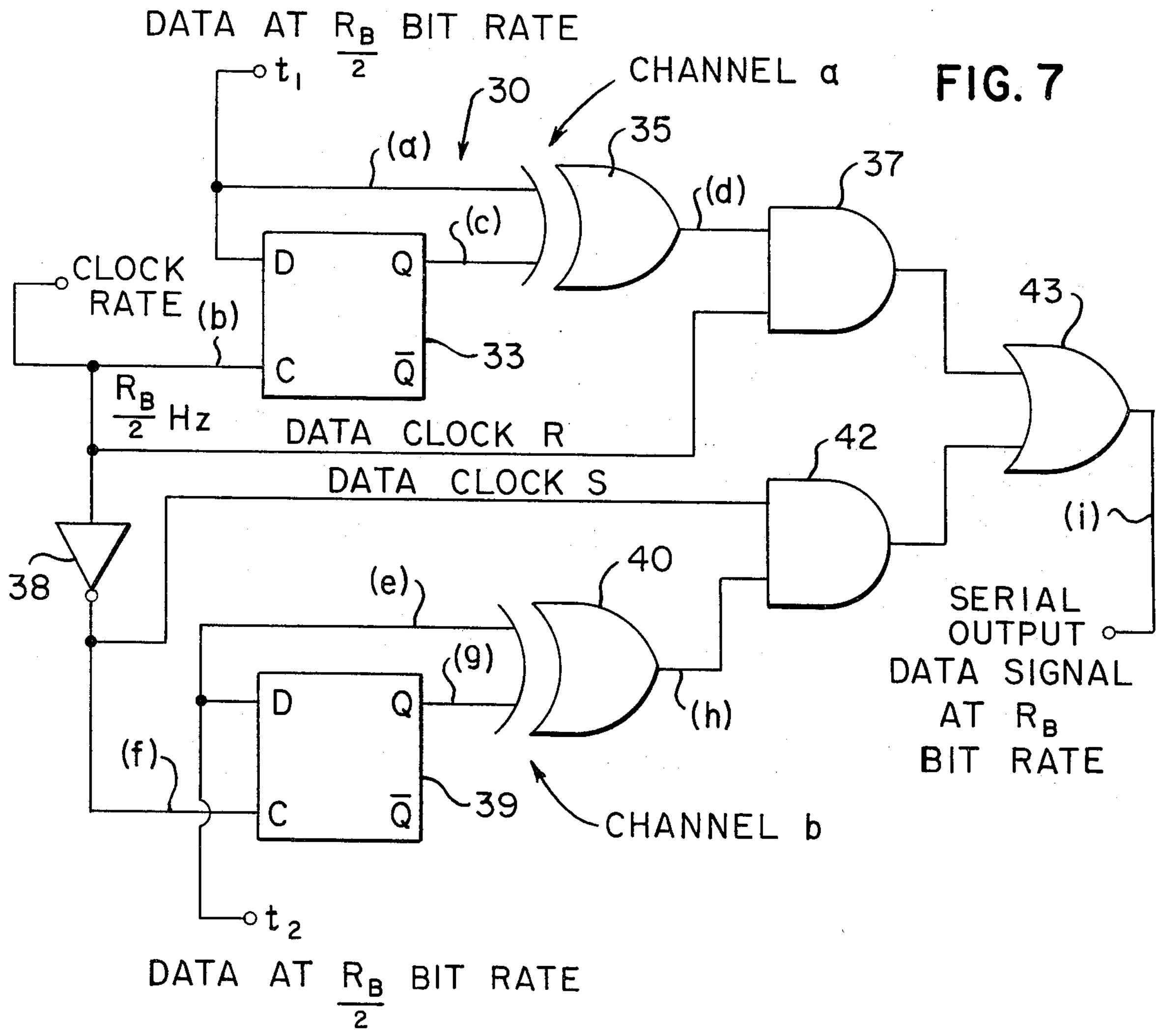
FIG. 7 shows in block diagram form the differential decoder portion of the present invention.

Referring now to FIG. 7, the differential decoder 30 is shown comprised of two data channels, channel *a* and channel *b*, for receiving the signals $t_1$, $t_2$, and the clock signal, designated data clock R. The data clock signal R has a bit rate of $R_B/_2$. In channel *a*, the signal $t_1$ is applied to the D input of a clocked flip-flop 33, and to an input of an EXCLUSIVE-OR gate 35. The data clock R is applied to the C input of flip-flop 33, and to an input of an AND gate 37, as well as to the input of an inverting amplifier 38. The signal at the Q output of flip-flop 33 is applied to the other input of the EXCLUSIVE-OR gate 35. The signal at the output of gate 35 is applied to the other input of the AND gate 37.

In channel *b*, the signal $t_2$ is applied to the D input of a clocked flip-flop 39, and to an input of an EXCLUSIVE-OR gate 40. Inverting amplifier 38 inverts the data clock signal R, present at its input, to provide the data clock signal S, which signal is applied to the C input of flip-flop 39, and to an input of an AND gate 42. The signal at the Q output of flip-flop 39 is applied to the other input of the EXCLUSIVE-OR gate 40. The signal present at the output of gate 40 is applied to the other input of ANd gate 42. The signals present at the outputs of AND gates 37 and 42 are applied to the inputs of an OR gate 43. The signal present at the output of OR gate 43 is the decoded serial data signal 70, which signal corresponds to the serial data signal 12 that was applied to the encoder 10, in FIG. 1.

Figure 8:
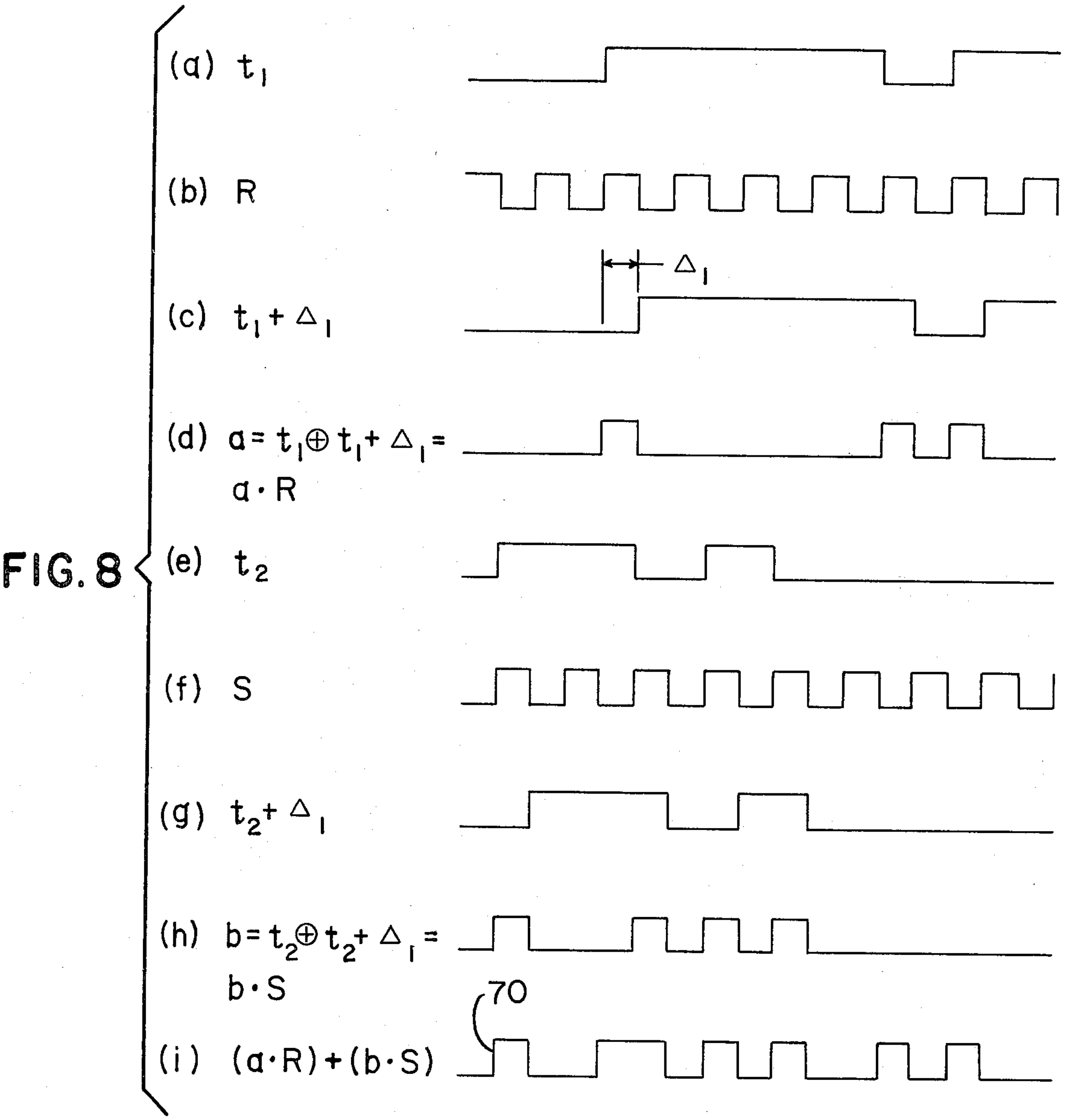
FIG. 8 is a timing diagram showing a series of waveforms illustrating the relationship of signals in different portions of the decoder of FIG. 7 for a first condition.

FIG. 8 depicts the waveforms that are present within the decoder for the condition of no channel ambiguity at the output of the coherent detector; that is, the condition where the signal $t_1$ corresponds to the A-channel signal $T_1$ (FIG. 4(*g*)) and the signal $t_2$ corresponds to the B-channel signal $T_2$ (FIG. 4(*k*)).

Referring now to the FIG. 8 waveforms in conjunction with the decder schematic of FIG. 7; the demodulated signal $t_1$ shown in FIG. 8(*a*) is applied to the D input of flip-flop 33 to be clocked through flip-flop 33 on the negative-going transitions of the data clock R, shown in FIG. 8(*b*). The signal at the Q output of flip-flop 33 is the signal $t_1$ delayed by an amount $\Delta_1$, which delay is equal to one data bit time $R_B$. The delayed signal is shown in FIG. 8(*c*). The EXCLUSIVE-OR gate 35 combines the signal $t_1$ with the delayed signal $t_1+\Delta_1$ in a modulo-two (differential) operation to provide the partially decoded *a*-channel signal, shown in FIG. 8(*d*). The phase ambiguity for this channel has been removed from the channel signal at this point. The demodulated signal $t_2$ shown in FIG. 8(*e*) is applied to the D input of flip-flop 39 to be clocked through flip-flop 39 on the negative-going transitions of the data clock S, shown in FIG. 8(*f*). The signal at the Q output of flip-flop 39 is the signal $t_2$, delayed by the amount 1. The delayed signal is shown in FIG. 8(*g*). The EXCLUSIVE-OR gate 40 combines the signal $t_2$, with the delayed signal, $t_2+\Delta_1$, to provide the partially decoded b-channel signal, shown in FIG 8(*h*). The phase ambiguity for this channel has been removed from the channel signal at this point. The *a*-channel signal and the *b*-channel signal are gated through AND gates 37 and 42, respectively, by the data clock signals R and S, respectively. Because of the relationship between the channel signals and their respective associated data clock signals, the gated signals, appearing at the outputs of AND gates 37 and 42, will be the *a*-channel and the *b*-channel signals unchanged.

The OR gate 43 receives the gated signals and logically adds them together to arrive at the serial data signal 70, which signal is shown in FIG. 8(*e*), and which signal corresponds on a one-to-one relationship with the input serial data signal 12 of FIG. 4(*a*).

Figure 9:
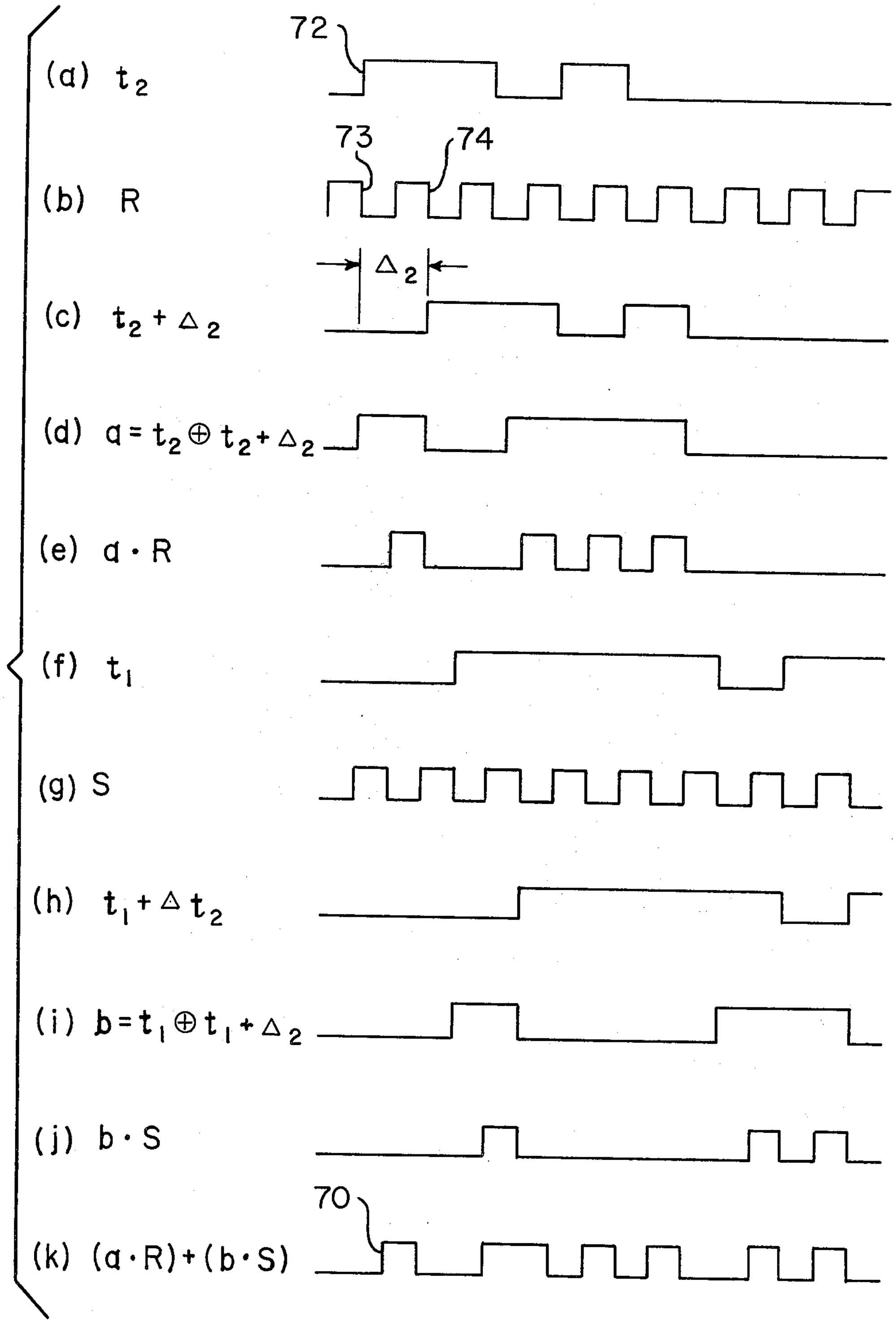
FIG. 9 is a timing diagram showing a series of waveforms illustrating the relationship of signals in different portions of the decoder of FIG. 7 for a second condition.

FIG. 9 depicts waveforms that correspond to the case wherein an ambiguity exists between the channels, that is, wherein the signal $t_2$ corresponds to the A-channel signal $T_1$ (FIG. 4(*g*)) and the signal $t_1$ corresponds to the B-channel signal $T_2$ (FIG. 4(*k*)).

Referring now to the FIG. 9 waveforms in conjunction with the decoder schematic of FIG. 7; the demodulated signal $t_2$, shown in FIG. 9(*a*), is applied to the D input of flip-flop 33, to be clocked through flip-flop 33 on the negative-going transitions of the data clock R, shown in FIG. 9(*b*). The negative-going transition 73 of the data clock signal R occurs slightly before the data transition 72 in the signal $t_2$. Therefore the next negative-going transition 74 in the data clock signal R clocks the signal $t_2$ to the output Q of the flip-flop 33. The slight delay between the negative transitions of the clock signals and the change in data level of the clocked signals, such as signal $t_2$, is caused by the slight response time delay encountered by the signal $t_2$ as it moves through the various physical circuits. The signal at the Q output will therefore be the signal $t_2$, delayed by an amount $\Delta_2$, which delay is approximately equal to two data bit times ($2R_B$). The delayed signal is shown in FIG. 9(*c*). The EXCLUSIVE-OR gate 35 combines the signal $t_2$ with the delayed signal $t_2+\Delta_2$, in a modulo-two operation to provide the *a*-channel signal, shown in FIG. 9(*d*). The *a*-channel signal is then gated through the AND gate 37 by the data clock signal R, to provide the signal shown in FIG. 9(*e*), which signal is applied to an input of the OR gate 43. Comparison of this waveform against the waveform shown in FIG. 8(*h*) reveals that they are the same.

The demodulated signal $t_1$, shown in FIG. 9(*f*), is applied to the D input of flip-flop 39 to be clocked through flip-flop 39 on the negative-going transitions of the data clock S, shown in FIG. 9(*g*). The signal present at the Q output of flip-flop 39 is the signal $t_1$, delayed by the amount $\Delta_2$. The delayed signal is shown in FIG. 9(*h*). The EXCLUSIVE-OR gate 40 combines the signal $t_1$ with the delayed signal $t_1+\Delta_2$, to provide the *b*-channel signal, shown in FIG. 9(*i*).

The *b*-channel is then gated through the AND gate 42 by the data clock signal S, to provide the signal shown in FIG. 9(*j*), which signal is applied to the other input of the OR gate 43.

The OR gate 43 logically adds the signals of FIGS. 9(*e*) and 9(*g*) to arrive at the serial data signal 70, which signal is shown in FIG. 9(*k*), and which signal corresponds on a one-to-one relationship with the input serial data signal 12 of FIG. 4(*a*).

From the foregoing description it can be seen that the present encoding and decoding system eliminates both phase and channel ambiguities from a staggered quadriphase differential type transmission system.

Although the invention has been described in detail above, it is not intended that the invention should be limited to the specific embodiments described but only in accordance with the spirit and the scope of the appended claims.

What is claimed is:

1. An encoder and decoder for use in a digital data transmission system for the encoding and decoding of a digital data signal wherein said encoder comprises:

a first and a second encoder channel wherein said digital data signal is alternately clocked thru said first and said second channel at staggered times by a clock signal and an inverted clock signal, respectively;

means in each of said channels for providing the complement signal of the digital signal present at a channel input upon the occurrence of a transition in a channel associated clock signal;

means in each of said channels for logically AND'ing the provided complement signal with the channel associated clock signal to provide an AND'ed signal;

means in each of said channels for dividing said AND'ed signal by a common factor to provide a channel encoded signal; and wherein said decoder comprises:

a first and a second decoder channel wherein the one channel encoded signal is applied to said first decoder channel and the other channel encoded signal is applied to said second decoder channel;

means in each of said channels for delaying the respective channel encoded signal for a predetermined time interval;

means in each of said decoder channels for combining the delayed channel encoded signal with the undelayed channel encoded signal to provide a partially decoded signal;

means in each of said decoder channels for gating said partially decoded signal as a function of a channel associated clock signal to provide a channel data signal; and means for combining the channel data signal from each of said decoder channel gating means to provide a decoded digital data signal.

2. The encoder and decoder according to claim 1 wherein said means for providing the complement signal of the digital data signal is a clocked flip-flop.

3. The encoder and decoder according to claim 1 wherein said means for logically AND'ing is a NOR gate.

4. The encoder and decoder according to claim 1 wherein said means for dividing is a clocked flip-flop having a clocking input for receiving said ANd'ed signal, a data input, and complementary outputs, said data input connected to one of said complementary outputs, said channel encoded signal being taken from the other of said complementary outputs.

5. The encoder and decoder according to claim 1 wherein said means for delaying the respective channel encoded signal is a clocked flip-flop having a clocking input for receiving a detected clock signal, a data input for receiving a respective channel encoded signal, and an output, the signal present at said output being the signal present at said data input during a transition of the detected clock signal.

6. The encoder and decoder according to claim 1 wherein said means for combining the delayed channel encoded signal with the undelayed channel encoded signal is an EXCLUSIVE-OR gate.

7. The encoder and decoder according to claim 1 wherein said means for gating said partially decoded signals is an AND gate.

8. The encoder and decoder according to claim 1 wherein said means for combining the channel data signals is an OR gate.

9. An encoder for use in a digital data transmission system for the encoding of a digital data signal wherein said digital data signal is comprised of successive bit periods having transitions between first and second levels, said encoder comprising:

first and second encoder channels adapted to receive said digital data signal and first and second train of pulses, said first and second train of pulses comprising pulses each having a width equal to the bit period of said digital data signal, with the second train of pulses being inverted from said first train of pulses;

means for interleaving said digital data signal between said first and said second encoder channels in response to said first and said second train of clock pulses, respectively, at a rate corresponding to one-half of the data bit period;

means in each of said channels for logically AND'ing the complement of the interleaved digital data signal with the channel associated clock signal to provide an AND'ed signal;

means in each of said channels for dividing said AND'ed signal in rate by a common factor to provide the channel encoded signals.

10. The encoder according to claim 9 wherein said means for logically AND'ing is a NOR gate.

11. The encoder according to claim 9 wherein said means for dividing said AND'ed signal is a clocked flip-flop having a clocking input for receiving said AND'ed signal, a data input, and complementary outputs, said data input connected to one of said complementary outputs, said channel encoded signal being taken from the other of said complementary outputs.

12. The encoder according to claim 9 wherein said means for dividing said AND'ed signal is a divide-by-two means.

13. A decoder for use in a digital data transmission system for the decoding of channel encoded signals comprising:

a first decoder channel means for comparing a previously received portion of a channel encoded signal against a successively received portion of the received channel signal to provide a first difference signal;

a second decoder means for comparing a previously received portion of a channel encoded signal against a successively received portion of the channel encoded signal to provide a second difference signal;

a first and a second gating means for gating said first and said second difference signals in response to a clock signal and an inverted clock signal, respectively; and gating means for adding the gated signals from said first and said second gating means to provide a decoded signal.

14. The decoder according to claim 13 wherein said first and said second gating means are AND gates.

15. The decoder according to claim 13 wherein said gating means for adding is an OR gate.

16. An encoder for use in a digital data transmission system for the encoding of a digital data signal wherein said digital data signal is comprised of successive bit periods having transitions between first and second levels, said encoder comprising:

first and second encoder channels adapted to receive said digital data signal and a first and second train of pulses, respectively, wherein said first and second train of pulses are comprised of pulses having a width equal to the bit period of said digital data signal, with the second train of pulses being inverted from said first train of pulses; said first and said second encoder channels each comprised of;

a first clocked flip-flop having a clocking input for receiving the channel associated train of clock pulses, a data input for receiving said digital data signal, and complementary outputs;

a NOR gate having one input connected to a complementary output of said first clocked flip-flop and another input connected to receive the channel associated train of clock pulses;

a second clocked flip-flop, having a clocking input connected to the output of said NOR gate, a data input, and complementary outputs, one of said complementary outputs connected to said data input, the other of said complementary outputs containing a channel encoded signal.

17. A decoder for use in a digital data transmission system for the decoding of the two encoded channel signals resulting from the demodulation of a staggered quadriphase differential encoded channel signal comprising:

a first and a second decoder channel wherein each of said channels is comprised of;

a clocked flip-flop having a clocking input for receiving the channel associated recovered data clock signal, a data input for receiving the encoded channel signal, and complementary outputs;

an EXCLUSIVE-OR gate, having one input connected to the non-inverting output of said flip-flop and the other input connected to the data input of said flip-flop;

an AND gate having one input connected to the output of said EXCLUSIVE-OR gate and the other input connected to the clocking input of said flip-flop; and an OR gate having one input connected to the output of the AND gate of said first channel and the other input connected to the output of the AND gate of said second channel, with the output signal from said OR gate being the decoded signal.

* * * * *

UNITED STATES PATENT OFFICE
CERTIFICATE OF CORRECTION

PATENT NO. : 3,924,186

DATED : December 2, 1975

INVENTOR(S) : Robert S. Gordy, David E. Sanders and Alfred T. Anderson

It is certified that error appears in the above-identified patent and that said Letters Patent are hereby corrected as shown below:

Application No. on Title page of patent should be changed from "548,133" to --548,113--.

Signed and Sealed this

*ninth* Day of *March 1976*

[SEAL]

*Attest:*

RUTH C. MASON
*Attesting Officer*

C. MARSHALL DANN
*Commissioner of Patents and Trademarks*